US012202707B2

(12) United States Patent
Räsänen et al.

(10) Patent No.: US 12,202,707 B2
(45) Date of Patent: Jan. 21, 2025

(54) ELEVATOR ARRANGEMENT AND METHOD FOR CONSTRUCTING ELEVATOR

(71) Applicant: KONE Corporation, Helsinki (FI)

(72) Inventors: Matti Räsänen, Helsinki (FI); Markku Haapaniemi, Helsinki (FI); Anssi Venho, Helsinki (FI)

(73) Assignee: KONE CORPORATION, Helsinki (FI)

( * ) Notice: Subject to any disclaimer, the term of this patent is extended or adjusted under 35 U.S.C. 154(b) by 106 days.

(21) Appl. No.: 17/834,646

(22) Filed: Jun. 7, 2022

(65) Prior Publication Data

US 2022/0297978 A1 Sep. 22, 2022

Related U.S. Application Data

(63) Continuation of application No. PCT/EP2021/054923, filed on Feb. 26, 2021.

(30) Foreign Application Priority Data

Feb. 28, 2020 (EP) .................................... 20160139

(51) Int. Cl.
*B66B 19/00* (2006.01)
*B66B 7/02* (2006.01)
*B66B 11/00* (2006.01)

(52) U.S. Cl.
CPC ............ *B66B 19/002* (2013.01); *B66B 7/024* (2013.01); *B66B 11/0045* (2013.01); *B66B 19/005* (2013.01)

(58) Field of Classification Search
CPC ..... B66B 19/002; B66B 7/024; B66B 19/005; B66B 11/0045; B66B 7/027
See application file for complete search history.

(56) References Cited

U.S. PATENT DOCUMENTS 5,553,686 A * 9/1996 Jensen ...................... B66B 7/02 187/408
5,899,301 A * 5/1999 Aulanko ............ B66B 11/0045 187/254

(Continued)

FOREIGN PATENT DOCUMENTS

CN 104379488 A 2/2015
JP 6-1562 A 1/1994

(Continued)

OTHER PUBLICATIONS

Machine translation of JP H061562 A. (Year: 1994).*

(Continued)

*Primary Examiner* — Michael R Mansen
*Assistant Examiner* — Michelle M Mudwilder
(74) *Attorney, Agent, or Firm* — Birch, Stewart, Kolasch & Birch, LLP

(57) ABSTRACT

A method for constructing an elevator includes providing a hoisting machine unit, a guide rail line, an elevator car, a counterweight, and a hoisting roping; using the elevator car for transporting passengers and/or goods while the hoisting machine unit is in a first position; installing one or more guide rail sections into the guide rail line above a guide rail section of the hoisting machine unit; removing the hoisting machine unit from the first position; installing a guide rail section into the guide rail line in place from where the guide rail section of the hoisting machine unit was removed; hoisting the hoisting machine unit; mounting the hoisting machine unit to a second position which is higher than the first position; and using the elevator car for transporting passengers and/or goods while the hoisting machine unit is in the second position. An elevator arrangement is described for implementing the method.

12 Claims, 8 Drawing Sheets

(56) References Cited

U.S. PATENT DOCUMENTS

| | | | | |
|---|---|---|---|---|
| 6,401,873 | B1 * | 6/2002 | Mustalahti | B66B 7/027 187/292 |
| 6,830,131 | B2 * | 12/2004 | Mustalahti | B66B 7/027 187/254 |
| 9,309,092 | B2 * | 4/2016 | Tenhunen | B66B 11/0045 |
| 10,745,246 | B2 * | 8/2020 | Fonteneau | B66B 7/022 |
| 2009/0223751 | A1 * | 9/2009 | Peacock | B66B 19/00 187/414 |
| 2015/0107186 | A1 * | 4/2015 | Wilts | B66B 19/002 52/741.1 |

FOREIGN PATENT DOCUMENTS

| | | | | |
|---|---|---|---|---|
| JP | H061562 | A | * | 1/1994 |
| JP | 6-24673 | A | | 2/1994 |
| JP | 2006-213489 | A | | 8/2006 |

OTHER PUBLICATIONS

Extended European Search Report issued in Application No. 20160139.0 dated Sep. 9, 2020.

International Search Report for PCT/EP2021/054923 (PCT/ISA/210) mailed on Apr. 20, 2021.

Written Opinion of the International Searching Authority for PCT/EP2021/054923 (PCT/ISA/237) mailed on Apr. 20, 2021.

Chinese Office Action and Search Report for corres inese Application No. 202180017483.4, dated Mar. 27, 2024, with English translation.

* cited by examiner

ELEVATOR ARRANGEMENT AND METHOD FOR CONSTRUCTING ELEVATOR

CROSS REFERENCE TO RELATED APPLICATIONS

This application is a Continuation of PCT International Application No. PCT/EP2021/054923, filed on Feb. 26, 2021, which claims priority under 35 U.S.C. 119 (a) to patent application No. 20160139.0, filed in Europe on Feb. 28, 2020, all of which are hereby expressly incorporated by reference into the present application.

FIELD OF THE INVENTION

The invention relates to an elevator arrangement and a method for constructing an elevator. The elevator is preferably an elevator for transporting passengers and/or goods.

BACKGROUND OF THE INVENTION

In connection with so-called jump-lifts, the bottom part of an elevator hoistway is taken into use before the construction of the building has been completed. In this case the upper parts of the building as well as the top part of the elevator hoistway can be constructed at the same time as an elevator moving in the bottom part of the elevator hoistway already serves people on the lower floors of the building under construction. Typically in jump-lifts, the elevator car moving in the lower parts of the elevator hoistway is supported and moved during construction-time use with a hoisting machine supported on a machine room which is vertically movable in the elevator hoistway.

The car can hang from the movable machine room suspended by a hoisting roping during its use for transporting passengers and/or goods below the movable support structure.

Typically, construction work in the hoistway above the vertically movable machine room has been performed by working on an installation platform suspended from above and movable above the movable machine room, or alternatively by working on scaffolds mounted in the hoistway.

When the elevator hoistway under construction above the vertically movable machine room has reached a sufficient stage of completion, the completed part of the elevator hoistway can be taken into use. At this stage a “jump” is performed, wherein the vertically movable machine room is hoisted higher in the elevator hoistway. Thereafter, the car can reach a higher position than before the jump and start to serve additional floors.

In prior art, a drawback has been that the movable machine room is sturdy, big, heavy and laborious to construct and mount into the hoistway as well as move therein. A drawback has been that it has been difficult to find a well working alternative solution which is one or more of the following: lightweight, quick to build, simply used in a jump, does not necessitate great number of robust support points, and quick to convert into a final elevator. A drawback has been that the jumping process has limited positioning of the hoisting machine so that many layouts have not been practical.

BRIEF DESCRIPTION OF THE INVENTION

The object of the invention is to introduce an improved elevator arrangement and an improved method for constructing an elevator. An object is particularly to introduce a solution by which one or more of the above discussed drawbacks of prior art and/or drawbacks discussed or implied elsewhere in the description can be solved.

An object is particularly to provide a solution by which the top part of an elevator hoistway can be constructed and/or components thereof installed at the same time as an elevator car moving in the bottom part of the elevator hoistway already serves people on the lower floors of the building under construction, which solution is one or more of the following: lightweight, quick to build, simply usable in a jump, does not necessitate great number of robust support points, and is quick to convert into a final elevator. An object is moreover to provide a solution which allows positioning of the machinery also in a tight space.

It is brought forward a new method for constructing an elevator, the method comprising

- providing a hoisting machine unit, the hoisting machine unit comprising a hoisting machine, and a guide rail section, on which the hoisting machine is fixed;
- providing one or more guide rail lines in a hoistway for guiding an elevator car and/or a counterweight, said one or more guide rail lines comprising a guide rail line comprising plurality of guide rail sections, in particular piled on top of each other, said providing comprising positioning the hoisting machine unit such in a first position that the guide rail section of the hoisting machine unit is one of said plurality of guide sections, and such that the guide rail line comprises one or more guide rail sections below the guide rail section of the hoisting machine unit; and
- providing an elevator car and a counterweight in the hoistway; and
- providing a hoisting roping interconnecting the elevator car and the counterweight, which hoisting roping in particular passes around a drive wheel of the hoisting machine; and
- using (first using) the elevator car for transporting passengers and/or goods while the hoisting machine unit is in said first position; and
- installing one or more guide rail sections into the guide rail line above the guide rail section of the hoisting machine unit, in particular on top of the topmost guide rail section of the guide rail line to extend the guide rail line to reach higher; and
- removing the hoisting machine unit from said first position after a period of said using; and
- installing a guide rail section into the guide rail line in place from where the guide rail section of the hoisting machine unit was removed in said removing, the guide rail section being installed preferably having the same or at least substantially the same length as the guide rail section of the hoisting machine unit; and
- hoisting the hoisting machine unit; and
- mounting the hoisting machine unit to a second position, which is higher than the first position, wherein said mounting comprises placing the guide rail section of the hoisting machine unit on top of the guide rail line; and
- using (second using) the elevator car for transporting passengers and/or goods while the hoisting machine unit is in said second position.

With this kind of solution one or more of the above mentioned objects can be achieved. Particularly, hereby a construction time elevator can be one or more of the following lightweight, quick to build, simply used in a jump and quick to convert into a final elevator. The method can also be implemented without necessity to provide a great number of robust support points in the hoistway walls or other structures for anchoring parts of the elevator which need to be hoisted during the progress of the method.

Preferable further details of the method are introduced in the following, which further details can be combined with the method individually or in any combination.

In a preferred embodiment, the method comprises providing a hoisting arrangement actuatable to hoist and/or to lower the guide rail section immediately above the guide rail section of the hoisting machine unit.

In a preferred embodiment, the method comprises hoisting the guide rail section immediately above the guide rail section of the hoisting machine unit before removing the hoisting machine unit from said first position, in particular by actuating a hoisting arrangement.

In a preferred embodiment, the guide rail section being installed has the same or at least substantially the same length as the guide rail section of the hoisting machine unit.

In a preferred embodiment, in said hoisting the guide rail section, the guide rail section immediately above the guide rail section of the hoisting machine unit is hoisted such that the guide rail section immediately above the guide rail section of the hoisting machine unit is raised from being vertically supported by the guide rail section of the hoisting machine unit and/or such that a gap is formed or enlarged between the guide rail section of the hoisting machine unit and the guide rail section immediately above the guide rail section of the hoisting machine unit.

In a preferred embodiment, the method comprises between said removing and installing, supporting vertically the guide rail section which was previously immediately above the guide rail section of the hoisting machine unit with a hoisting arrangement, in particular for preventing it from falling to the place from where the guide rail section of the hoisting machine unit was removed.

In a preferred embodiment, after said installing a guide rail section into the guide rail line in place from where the guide rail section of the hoisting machine unit was removed in said removing, the method comprises lowering the guide rail section which was previously immediately above the guide rail section of the hoisting machine unit towards the guide rail section installed. The lowering is preferably performed by actuating a hoisting arrangement.

In a preferred embodiment, said hoisting the hoisting machine unit is performed with a working platform vertically movable in the hoistway above the car.

In a preferred embodiment, the hoisting and/or lowering is performed with one or more actuatable hoisting devices of the hoisting arrangement. Particularly, the aforementioned one or more actuatable hoisting devices are actuatable to hoist and/or lower the guide rail section immediately above the guide rail section of the hoisting machine unit.

Preferably, the aforementioned one or more actuatable hoisting devices are supported by the guide rail section immediately below the guide rail section of the hoisting machine unit, preferably via a bracket fixed on the guide rail section immediately below the guide rail section of the hoisting machine unit.

Preferably, the aforementioned one or more actuatable hoisting devices are actuatable to hoist and/or lower the guide rail section immediately above the guide rail section of the hoisting machine unit via a bracket fixed on the guide rail section immediately above the guide rail section of the hoisting machine unit.

In a preferred embodiment, the hoisting and/or lowering is performed by the actuatable hoisting arrangement, preferably by an automatic actuation system thereof, in response to receiving a signal from an operating interface.

In a preferred embodiment, the method comprises, after said removing, mounting the hoisting machine unit on a working platform, in particular to be hoisted to a higher position with the working platform.

In a preferred embodiment, the method comprises, during said first and/or second using, installing elevator components from a working platform in the parts of the hoistway above the elevator car. Preferably, said installing comprises installing one or more guide rail sections into the guide rail line above the guide rail section of the hoisting machine unit, in particular on top of the topmost guide rail section of the guide rail line to extend the guide rail line to reach higher. Preferably, said installing moreover comprises fixing the guide rail sections with one or more brackets immovably into the hoistway.

In a preferred embodiment, the installing a guide rail section into the guide rail line in place from where the guide rail section of the hoisting machine unit was removed in said removing comprises connecting the lower end of the guide rail section to be installed to the upper end of a guide rail section (1*a*) with a fixing element fixed directly to the upper end of the guide rail section (1*a*), and connecting the upper end of the guide rail section to be installed to the lower end of a guide rail section (1*c*) with a fixing element fixed directly to the lower end of the guide rail section (1*c*). Said guide rail rail 1*a* here is the guide rail section that previously was immediately below the guide rail section of the hoisting machine unit, and said guide rail section (1*c*) is the guide rail section that previously was immediately above the guide rail section of the hoisting machine unit.

In a preferred embodiment, one or more guide rail sections of the guide rail line (to which the guide rail section of the hoisting machine unit belongs) is supported laterally immovably in the hoistway with one or more brackets, such as brackets engaging frictionally the guide rail section such as with one or more guide rail clips allowing vertical movement of the guide rail section. Implementation with guide rail clips provides good adaptability of the guide rail line to dimension changes of the building as well as easy fixing thereof. Implementation with guide rail clips also provides easy hoisting and/or lowering of the guide rail section immediately above of the guide rail section 1*b* of the hoisting machine unit.

In a preferred embodiment, consecutive guide rail sections of the guide rail line (to which the guide rail section of the hoisting machine unit belongs) are immovably connected to each other, preferably with a fixing member, such as a fish plate, fixed directly to the opposing ends of the consecutive guide rail sections.

In a preferred embodiment, the method comprises after said installing a guide rail section into the guide rail line removing the hoisting arrangement and mounting it into a higher position in the hoistway. Thereby, it can later be used for removing of the hoisting machine unit from the second position.

In a preferred embodiment, the removing preferably comprises suspending the hoisting machine unit with a suspender connected to the hoisting machine unit and supported by a structure other than the guide rail line.

In a preferred embodiment, said first and/or second using comprises receiving by an elevator control system call signals from one or more user interfaces, such as one or more user interfaces located at floors and/or in the elevator car and/or mobile user interfaces, which elevator control system is connected with the motor of the hoisting machine unit, and automatically controlling in response to said call signals, by the elevator control system, rotation of the motor, and thereby movement of the elevator car.

It is also brought forward a new elevator arrangement comprising a hoistway; a hoisting machine unit in a first position in a hoistway, the hoisting machine unit comprising a hoisting machine, and a guide rail section, on which the hoisting machine is fixed; and one or more vertically oriented guide rail lines in a hoistway for guiding an elevator car or a counterweight, comprising a vertically oriented guide rail line for guiding an elevator car or a counterweight and comprising plurality of guide rail sections, in particular piled on top of each other, wherein the guide rail section of the hoisting machine unit is one of said plurality of guide sections, and wherein the guide rail line comprises one or more guide rail sections below the guide rail section of the hoisting machine unit. The guide rail line comprises one or more guide rail sections above the guide rail section of the hoisting machine unit; and the elevator arrangement comprises a hoisting arrangement actuatable to hoist and/or to lower the guide rail section immediately above the guide rail section of the hoisting machine unit.

With this kind of solution one or more of the above mentioned objects can be achieved. Hereby removal of the hoisting machine unit from said first position to be moved to a new position is facilitated. Also, replacement thereof with another guide rail section is facilitated. Particularly, hereby a construction time elevator can be one or more of the following lightweight, quick to build, simply used in a jump and quick to convert into a final elevator. The method can also be implemented without necessity to provide a great number of robust support points in the hoistway walls or other structures for anchoring parts of the elevator which need to be hoisted during the progress of the method.

Preferable further details of the elevator arrangement have been introduced earlier above and will be introduced in the following, which further details can be combined with the elevator arrangement individually or in any combination.

In a preferred embodiment, the hoisting arrangement is actuatable to hoist the guide rail section immediately above the guide rail section of the hoisting machine unit, in particular such that the guide rail section immediately above the guide rail section of the hoisting machine unit is raised from being vertically supported by the guide rail section of the hoisting machine unit and/or such that a gap is formed or enlarged between the guide rail section of the hoisting machine unit and the guide rail section immediately above the guide rail section of the hoisting machine unit. Thus, it is facilitated that the weight of the guide rail sections above the guide rail section of hoisting machine unit can be raised from being carried by the guide rail section of the hoisting machine unit and/or that additional gap can be provided. Hereby removal of the hoisting machine unit from said first position to be moved to a new position is facilitated.

In a preferred embodiment, the hoisting arrangement is actuatable to lower the guide rail section immediately above the guide rail section of the hoisting machine unit. This facilitates that it can be lowered to rest on a guide rail section replacing the guide rail section of the hoisting machine unit.

In a preferred embodiment, the hoisting machine comprises a drive wheel for driving a hoisting roping and a motor for rotating the drive wheel.

In a preferred embodiment, the hoisting machine is, when in said first and/or second position, between the guide rail section of the hoisting machine unit and a wall of the hoistway. The hoisting machine is then particularly on the opposite side of said guide rail section than the elevator car when viewed from above. In this kind of case, the space for removing and hoisting of the hoisting machine to a higher position, is typically insufficient and thereby when the hoisting machine is thus located, the arrangement as well as the method are particularly advantageous.

In a preferred embodiment, one or more guide rail sections of the guide rail line (to which the guide rail section of the hoisting machine unit belongs), are (or are installed to be in the installing step of the method) above the guide rail section of the hoisting machine unit supported laterally immovably in the hoistway with one or more brackets, such that when the hoisting machine is in said first position I and/or second position II the vertical projection of said one or more brackets and the vertical projection of the hoisting machine overlap. In this kind of case, hoisting of the hoisting machine to a higher position, is typically blocked by the brackets and thereby, the arrangement as well as the method are particularly advantageous in this context.

In a preferred embodiment, the guide rail sections of the guide rail line are piled on top of each other.

In a preferred embodiment, each guide rail section of said plurality of guide rail sections supports vertically the guide rail section immediately above it.

In a preferred embodiment, the elevator arrangement comprises a hoisting roping. Preferably, the ropes of the hoisting roping extend via a releasable rope clamp into a rope supply storage in the form of one or more rope reels where the additional rope needed in the method can be taken from. The rope supply storage can be preferably mounted on a landing or in the pit of the hoistway, for example.

In a preferred embodiment, the elevator arrangement comprises an elevator car and a counterweight; and a hoisting roping interconnecting the elevator car and a counterweight.

In a preferred embodiment, the hoisting arrangement comprises one or more hoisting devices actuatable to hoist and/or lower the guide rail section immediately above the guide rail section of the hoisting machine unit, preferably in particular via a bracket fixed on the guide rail section immediately above the guide rail section of the hoisting machine unit. The advantage of hoisting via said bracket is that the vertical forces needed in the hoisting and/or lowering can be transmitted to the guide rail section in a simple manner.

In a preferred embodiment, the hoisting arrangement comprises one or more hoisting devices supported by the guide rail section immediately below the guide rail section of the hoisting machine unit, preferably via a bracket fixed on the guide rail section immediately below the guide rail section of the hoisting machine unit. The advantage of this type of supporting is that hereby the vertical reaction forces needed in the hoisting and/or lowering can be taken in a simple manner.

In a preferred embodiment, consecutive guide rail sections of the guide rail line (to which the guide rail section of the hoisting machine unit belongs) are immovably connected to each other, preferably with a fixing member, such as a fish plate, fixed directly to the opposing ends of the consecutive guide rail sections.

In a preferred embodiment, each said hoisting device is a hydraulic jack or a screw jack.

In a preferred embodiment, each said hoisting device is actuatable to expand or contract in vertical direction.

In a preferred embodiment, the elevator arrangement comprises a suspender connected to the hoisting machine unit. Preferably, the suspender is supported by a structure other than the guide rail line.

In a preferred embodiment, the elevator arrangement comprises a second hoisting arrangement comprising the suspender and a second hoisting device, e.g. mounted on the working platform, and said suspender is movable by the second hoisting device.

In a preferred embodiment, said structure other than the guide rail line is a working platform vertically movable in the hoistway.

In a preferred embodiment, the hoisting arrangement is actuatable manually or by an automatic actuating system.

In a preferred embodiment, each said hoisting device is actuatable manually or by an automatic actuating system. In the first case, each hoisting device is preferably actuatable to achieve hoisting by manually operating a manual operating means. Correspondingly, each hoisting device is preferably actuatable to achieve lowering by manually operating a manual operating means. For the purpose of manual actuation, the hoisting arrangement preferably comprises manually operable actuating means. In the latter case, the arrangement can comprise an automatic actuation system.

In a preferred embodiment, the hoisting arrangement comprises an operating interface operable to control actuation of the actuatable hoisting arrangement. The operating interface is preferably in the form of an operating panel such as a push button panel or a touch screen, for instance.

In a preferred embodiment, the car has an interior space suitable for receiving a passenger or passengers, and a door movable between open and closed state for opening and closing the interior space.

In a preferred embodiment, the aforementioned operating interface is connected to an automatic actuation system of the one or more actuatable hoisting devices. The automatic actuation system on the other hand is preferably connected to each of said one or more hoisting devices.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

DETAILED DESCRIPTION

Figure 1:
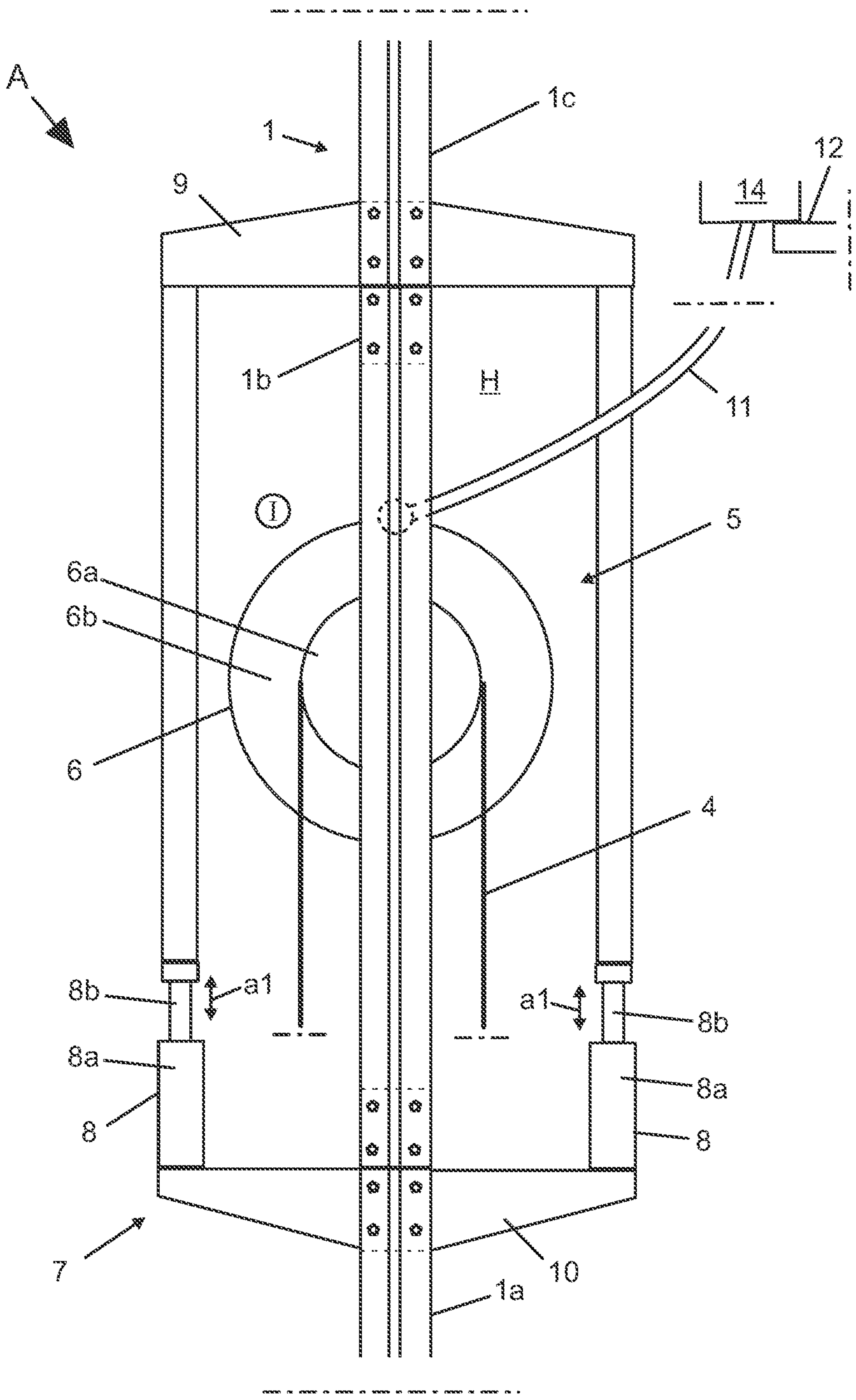
FIG. 1 illustrates a front view of an elevator arrangement A in a phase of a method for constructing an elevator according to an embodiment.

FIG. 1 illustrates an elevator arrangement A in a phase of a method for constructing an elevator according to an embodiment. The arrangement A comprises a hoistway H and a hoisting machine unit 5 mounted stationary in a first position I in the hoistway H. The hoisting machine unit 5 comprises a hoisting machine 6, and a guide rail section 1*b*, on which the hoisting machine 6 is fixed. The guide rail section 1*b*, on which the hoisting machine 6 is fixed, carries the full weight of the hoisting machine 6. The arrangement A comprises a vertically oriented guide rail line 1 in the hoistway, which is a guide rail line for guiding a movable elevator unit such as an elevator car 2 or a counterweight 3, the guide rail line 1 comprising plurality of guide rail sections 1*a*,1*b*,1*c* piled on top of each other. The guide rail section 1*b* of the hoisting machine unit 5 is one of said plurality of guide sections 1*a*,1*b*,1*c*, and the guide rail line 1 comprises one or more guide rail sections 1*a* below the guide rail section 1*b* of the hoisting machine unit 5. The guide rail line 1 moreover comprises one or more guide rail sections 1*a*,1*c* above the guide rail section 1*b* of the hoisting machine unit 5.

The elevator arrangement A comprises a hoisting arrangement 7 actuatable to hoist and/or to lower the guide rail section 1*c* immediately above the guide rail section 1*b* of the hoisting machine unit 5. Hereby removal of the hoisting machine unit 5 from said first position I to be moved to a new position is facilitated. Also, replacement thereof with another guide rail section is facilitated.

The hoisting arrangement 7 is actuatable to hoist the guide rail section 1*c* immediately above the guide rail section 1*b* of the hoisting machine unit 5, in particular such that the guide rail section 1*c* immediately above the guide rail section 1*b* of the hoisting machine unit 5 is raised from being vertically supported by the guide rail section 1*b* of the hoisting machine unit 5 and/or such that a gap is formed or enlarged between the guide rail section 1*b* of the hoisting machine unit 5 and the guide rail section 1*c* immediately above the guide rail section 1*b* of the hoisting machine unit 5. Thus, it is facilitated that the weight of the guide rail sections above the guide rail section 1*b* hoisting machine unit 5 can be raised from being carried by the guide rail section 1*b* of the hoisting machine unit 5 and/or that additional gap can be provided. Hereby removal of the hoisting machine unit 5 from said first position I to be moved to a new position is facilitated.

The hoisting arrangement 7 is moreover preferably actuatable to lower the guide rail section 1*c* immediately above the guide rail section 1*b* of the hoisting machine unit 5, e.g. after a hoisting of said guide rail section 1*b*. This facilitates that it can be lowered to rest on the guide rail section 1*b* of the hoisting machine unit 5 or on a guide rail section 1*d* replacing it.

The elevator arrangement A moreover comprises a hoisting roping 4, and the hoisting machine 6 comprises a drive wheel 6*a* for driving the hoisting roping 4, as well as a motor 6*b* for rotating the drive wheel 6*a*.

The hoisting arrangement 7 is in the preferably moreover such that it comprises one or more, in the embodiment of FIG. 1 particularly two, hoisting devices 8. Said hoisting devices 8 are actuatable to hoist or lower the guide rail section 1*c* immediately above the guide rail section 1*b* of the hoisting machine unit 5 in particular via a bracket 9 fixed on the guide rail section 1*c*.

The hoisting arrangement 7 is in the preferably moreover such that said hoisting devices 8 are supported by the guide rail section 1*a* immediately below the guide rail section 1*b* of the hoisting machine unit 5 in particular via a bracket 10 fixed on the guide rail section 1*a*.

Figure 9:
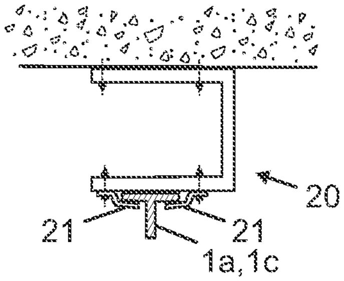
FIG. 9 illustrates preferred details of a bracket of FIG. 1.

Each said hoisting device 8 is preferably a hydraulic jack, as illustrated in FIG. 1. However, the hoisting arrangement could also be differently implemented by any known hoisting device, such as a screw jack or scissor jack or possibly some other type of hoisting device, such as a Tirak hoist, for example. In the illustrated case, each hydraulic jack 8 comprises a hydraulic cylinder member 8*a* and a piston member 8*b*. Each hydraulic jack 8 is preferably moreover such that the hydraulic cylinder member 8*a* comprises a hydraulic chamber (not showed) and the piston member 8*b* is movable in the hydraulic chamber. Hydraulic fluid can thus be pumped into the hydraulic chamber or extracted out from the hydraulic chamber in order to control movement of the piston member 8*b*. Actuation of the hoisting device 8 can in this case comprise pumping fluid into the hydraulic chamber or extracting fluid from the hydraulic chamber. The actuation can be arranged to be performed manually or by an actuating system. In the first case, each hydraulic jack can be actuatable to achieve hoisting by manually operating a manual operating means, such as a hand pump (e.g. a pumping lever) for instance, by which a user can pump hydraulic fluid into the chamber for achieving hoisting. Likewise, in the first case, the hydraulic jack can be actuatable to achieve lowering by manually operating a manual operating means, such as a release valve, for instance, which can release hydraulic fluid to flow out from the chamber for achieving lowering. In the manual version, each hoisting device can have its own manual operating means or alternatively they can share a a manual operating means whereby synchronized actuation is possible. In the latter case, the arrangement A can comprises an automatic actuation system 18 as illustrated in FIG. 9, which preferably comprises a hydraulic pump and a hydraulic valve system for actuating the hydraulic jack(s).

The elevator arrangement A preferably moreover comprises a suspender 11 connected to the hoisting machine unit 5, as illustrated in FIG. 1. Hereby, removal of the hoisting machine unit 5 from its first position without risk of falling is facilitated. The suspender 11 is supported by a structure 12 other than the guide rail line 1. Thus, the vertical forces when suspension is needed can be borne by a structure other than the guide rail line 1 to which the guide rail section 1*b* of the hoisting machine unit 5 belongs to.

Said structure 12 other than the guide rail line 1 is preferably a working platform 12 vertically movable in the hoistway H. In the preferred embodiment, this is implemented in particular such that the elevator arrangement A comprises a second hoisting arrangement comprising the aforementioned suspender 11 and a second hoisting device 14, e.g. mounted on a working platform 12, and said suspender 11 is movable by the hoisting device 14.

As mentioned, FIG. 1 illustrates an elevator arrangement A in a phase of a method for constructing an elevator according to an embodiment. Preferred details of the arrangement A and its use are illustrated in FIGS. 2-6 and 8. Preferably, the elevator arrangement A comprises an elevator car 2 and a counterweight 3; and a hoisting roping 4 interconnects the elevator car 2 and a counterweight 3. The elevator car 2 and a counterweight 3 as well as passage of the hoisting roping 4 are illustrated for example in FIG. 4. Preferably, the ropes of the hoisting roping 4 extend via a releasable rope clamp 16 into a rope supply storage 15 in the form of one or more rope reels where a additional rope can be taken from if/when needed for performing a jump. The rope supply storage 15 can be preferably mounted on a landing or in the pit of the hoistway, for example.

Figure 8:
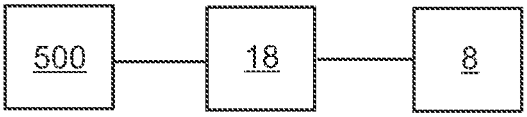
FIG. 8 illustrates an operating interface, an automatic actuation system and a hoisting device 8 and their preferred connections.

As illustrated in FIG. 8, the hoisting arrangement A can comprise an operating interface 500 operable to control actuation of the actuatable hoisting arrangement 7. The operating interface 500 is then preferably in the form of an operating panel such as a push button panel or a touch screen, for instance. The operating interface 500 is preferably connected to an automatic actuation system 18 of the one or more hoisting devices 8, wirelessly or with wired connection, as illustrated in FIG. 8. The automatic actuation system 18 on the other hand is preferably connected to each of said one or more hoisting devices 8. The automatic actuation system 18 can be a hydraulic automatic actuation system, for example, when the one or more hoisting devices 8 are hydraulic jacks. In this case, the automatic actuation system 18 would preferably comprise a hydraulic pump and a hydraulic valve system for actuating the hydraulic jack(s). If and when the one or more hoisting devices 8 would be screw jacks, the automatic actuation system 18 could comprise an electric motor for actuating the screw jack(s).

Figure 2:
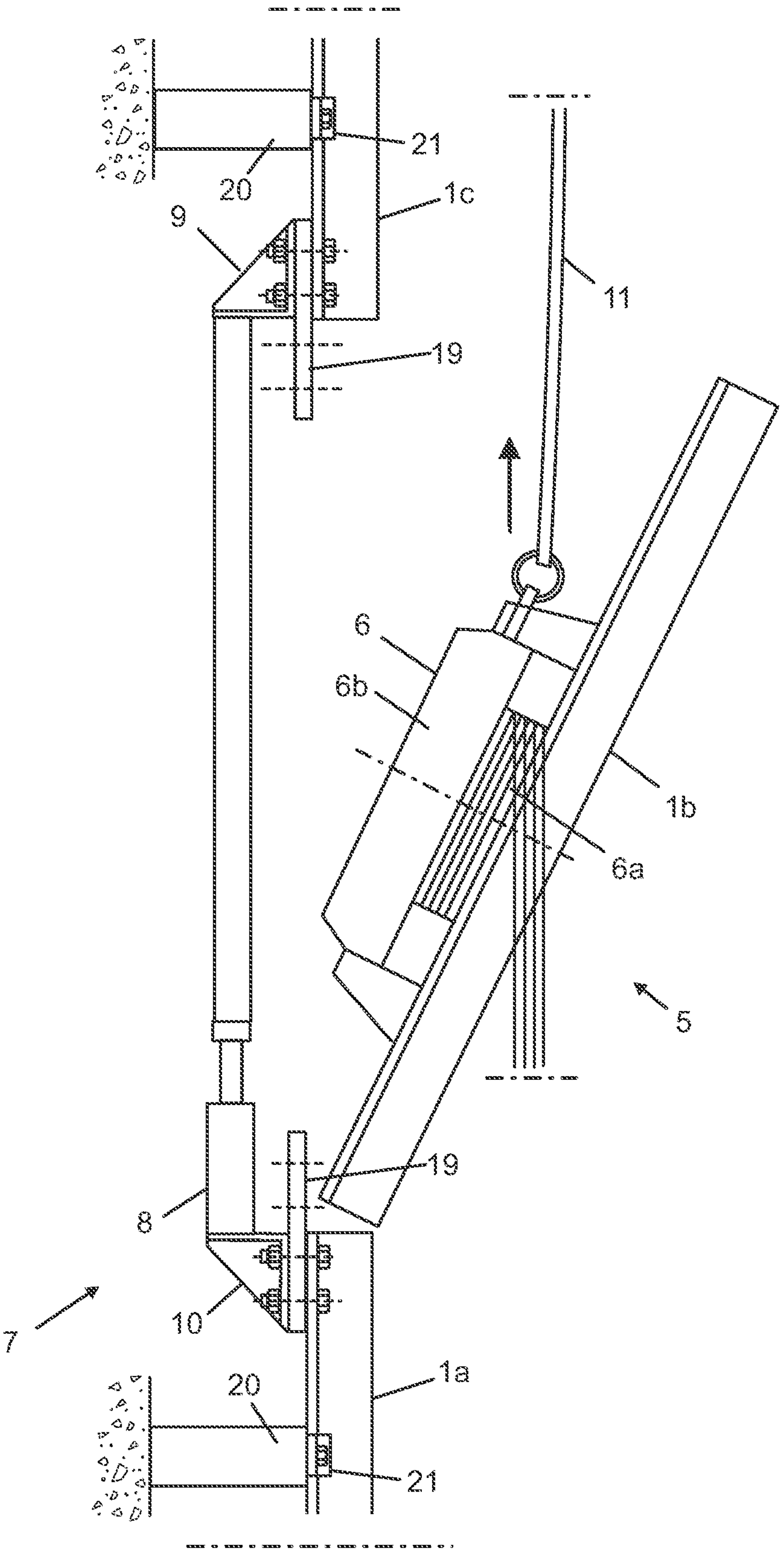
FIG. 2 illustrates a side view of the hoisting machine unit of FIG. 1 when being removed from a first position.

As illustrated in FIG. 1, consecutive guide rail sections of the guide rail line 1 are connected to each other e.g. with a fixing element 19, e.g. a fish plate, fixed, e.g. by bolts, directly to the opposing ends of the consecutive guide rail sections 1*a*,1*b*;1*b*;1*c*. FIG. 2 illustrates the fixing members 19 of FIG. 1 from a side at a phase where the connection of the consecutive guide rail sections 1*a*,1*b*;1*b*;1*c* has been released and the hoisting machine unit 5 is being removed.

Figure 4:
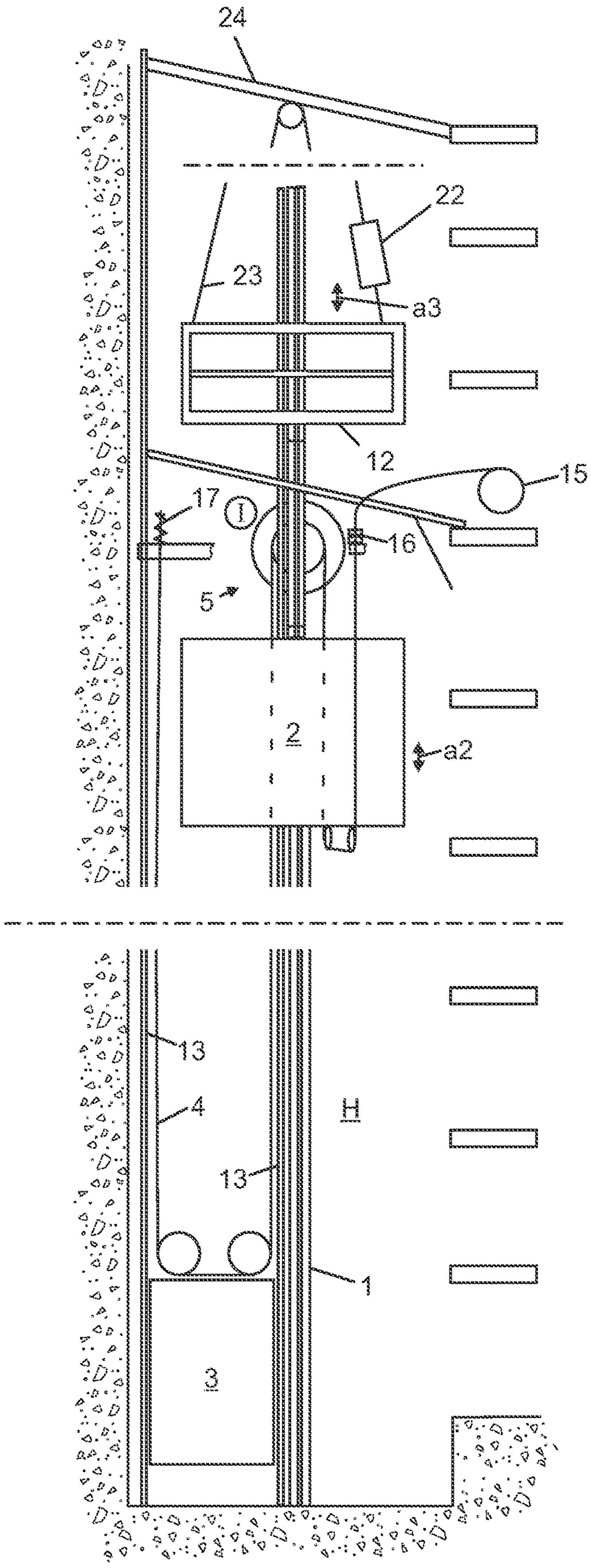
FIG. 4 illustrates a phase of a method for constructing an elevator according to an embodiment where a hoisting machine unit is in a first position.

FIG. 4 illustrates an elevator arrangement in a phase of a method for constructing an elevator according to an embodiment. The method comprises providing a hoisting machine unit 5, the hoisting machine unit 5 comprising a hoisting machine 6, and a guide rail section 1*b*, on which the hoisting machine 6 is fixed. The method moreover comprises providing one or more guide rail lines 1,13 in a hoistway for guiding an elevator car 2 and/or a counterweight 3, said one or more guide rail lines 1,13 comprising a guide rail line 1 comprising plurality of guide rail sections 1*a*,1*b*,1*c*, in particular piled on top of each other such that each guide rail section 1*a*,1*b*,1*c* supports vertically the guide rail section 1*a*,1*b*,1*c* immediately above it. Said providing one or more guide rail lines 1,13 comprises positioning the hoisting machine unit 5 such in a first position I that the guide rail section 1*b* of the hoisting machine unit 5 is one of said plurality of guide sections 1*a*,1*b*,1*c*, and the guide rail line 1 comprises one or more guide rail sections 1*a* below the guide rail section 1*b* of the hoisting machine unit 5. The method moreover comprises providing an elevator car 2 and a counterweight 3 in the hoistway H; and providing a hoisting roping 4 interconnecting the elevator car 2 and the counterweight 3, which hoisting roping 4 preferably passes around a drive wheel 6*a* of the hoisting machine 6.

The method moreover comprises using (first using) the elevator car 2 for transporting passengers and/or goods while the hoisting machine unit 5 is in said first position I. The first using is illustrated by arrow a2 in FIG. 4.

The method moreover comprises installing one or more guide rail sections 1*c* into the guide rail line 1 above the guide rail section 1*b* of the hoisting machine unit 5, in particular on top of the topmost guide rail section of the guide rail line 1 to extend the guide rail line 1 to reach higher.

After a period of said first using, the method comprises removing the hoisting machine unit 5 from said first position I and installing a guide rail section 1*d* into the guide rail line 1 in place from where the guide rail section 1*b* of the hoisting machine unit 5 was removed in said removing. The guide rail section 1*d* being installed preferably has the same or at least substantially the same length as the guide rail section 1*b* of the hoisting machine unit 5. Thereby, small amount of adjustment is needed in installing of the guide rail section 1*d*.

Figure 5:
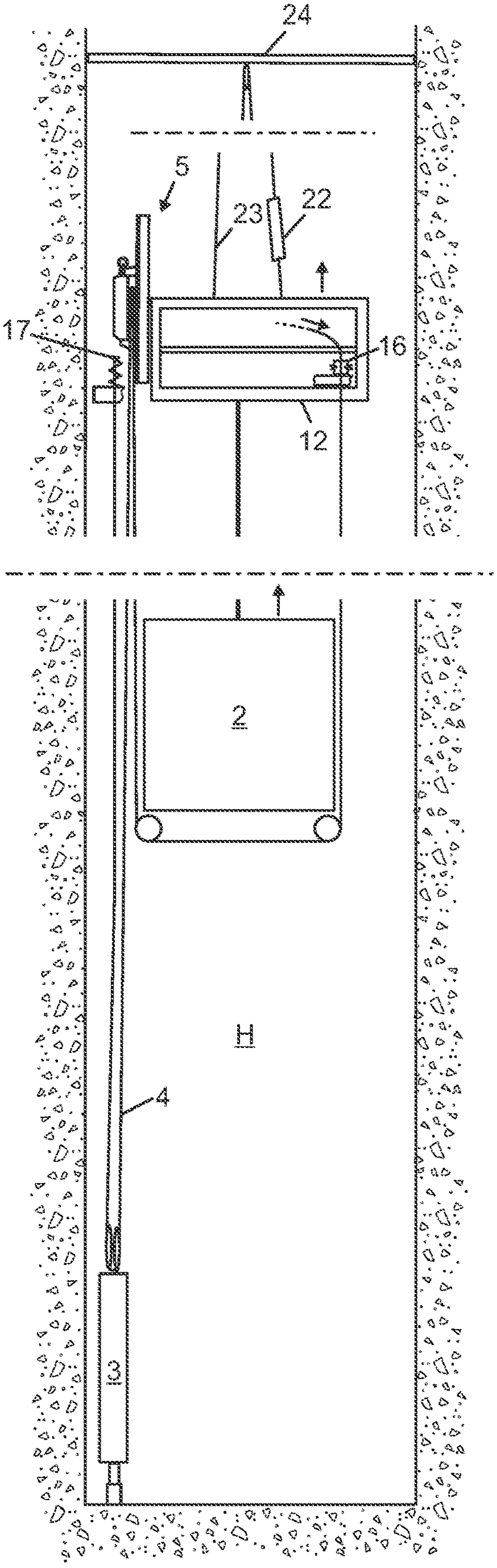
FIG. 5 illustrates as a side view a phase of a method for constructing an elevator according to an embodiment where a hoisting machine unit is hoisted.

After removing the hoisting machine unit 5 from said first position I the method comprises hoisting the hoisting machine unit 5. This phase is illustrated in FIG. 5.

Preferably, hoisting the hoisting machine unit 5 is performed with a working platform 12 vertically movable in the hoistway above the car 2. For facilitating hoisting of the hoisting machine unit 5 to proximity of the second position II, the method comprises after said removing, mounting the hoisting machine unit 5 on a working platform 12, as illustrated in FIG. 5.

Figure 6:
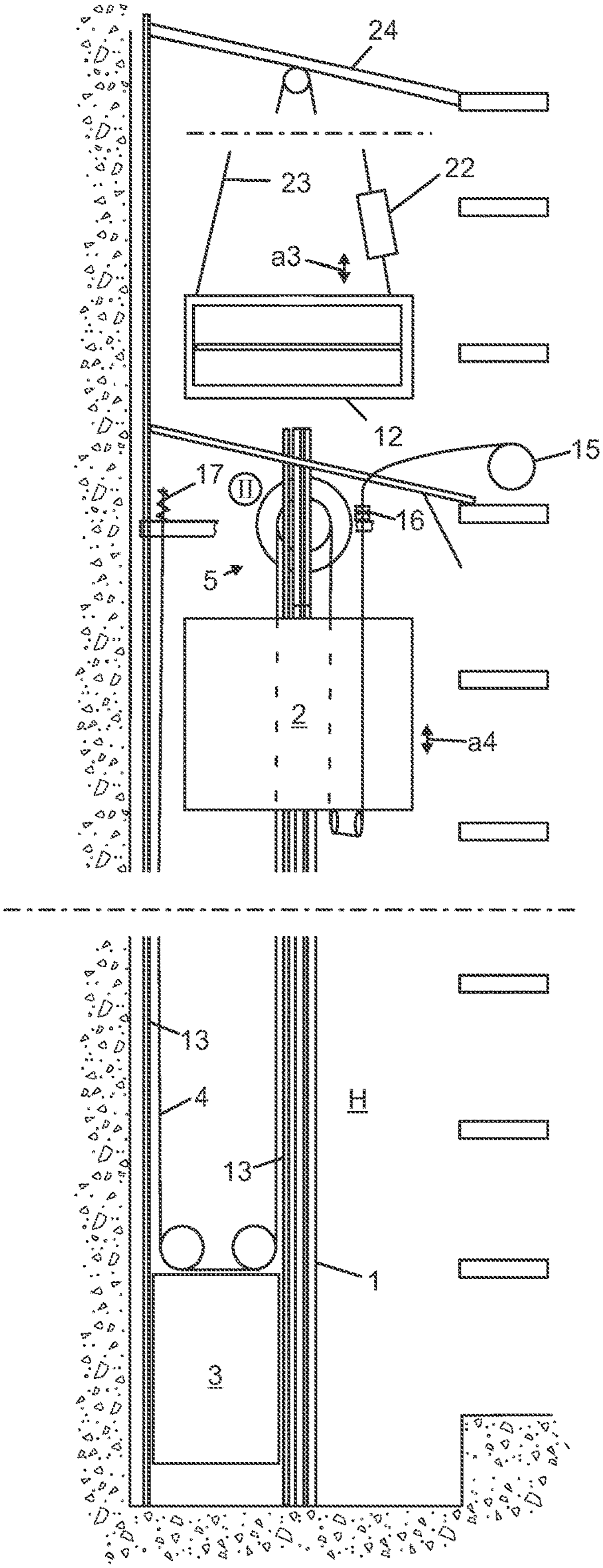
FIG. 6 illustrates a phase of a method for constructing an elevator according to an embodiment where a hoisting machine unit is in a second position.

After said hoisting, the method comprises mounting the hoisting machine unit 5 to a second position II which is higher than the first position I, wherein said mounting comprises placing the guide rail section 1*b* of the hoisting machine unit 5 on top of the guide rail line 1. Hereby, elevator structures are rearranged to make it possible that the car 2 can travel higher in the hoistway H and start serving additional floors. FIG. 6 illustrates a phase where the hoisting machine unit 5 has been mounted to the second position II.

After said mounting the hoisting machine unit 5 to a second position II, the method comprises using (second using) the elevator car 4 for transporting passengers and/or goods while the hoisting machine unit 5 is in said second position II. This using is illustrated in FIG. 6 by arrow a4.

The method comprises, during said first and/or second using, installing elevator components from a working platform 12 in the parts of the hoistway H above the elevator car 2, as illustrated by arrow a3 in FIGS. 4 and 6. The working platform 12 is preferably vertically movable with a third hoisting arrangement 22,23, e.g. comprising a hoist 22 and a cable, chain, rope or equivalent 23, for example, which third hoisting arrangement 22,23 takes support from a structure 24 mounted in the upper end of the hoistway H.

Figure 7:
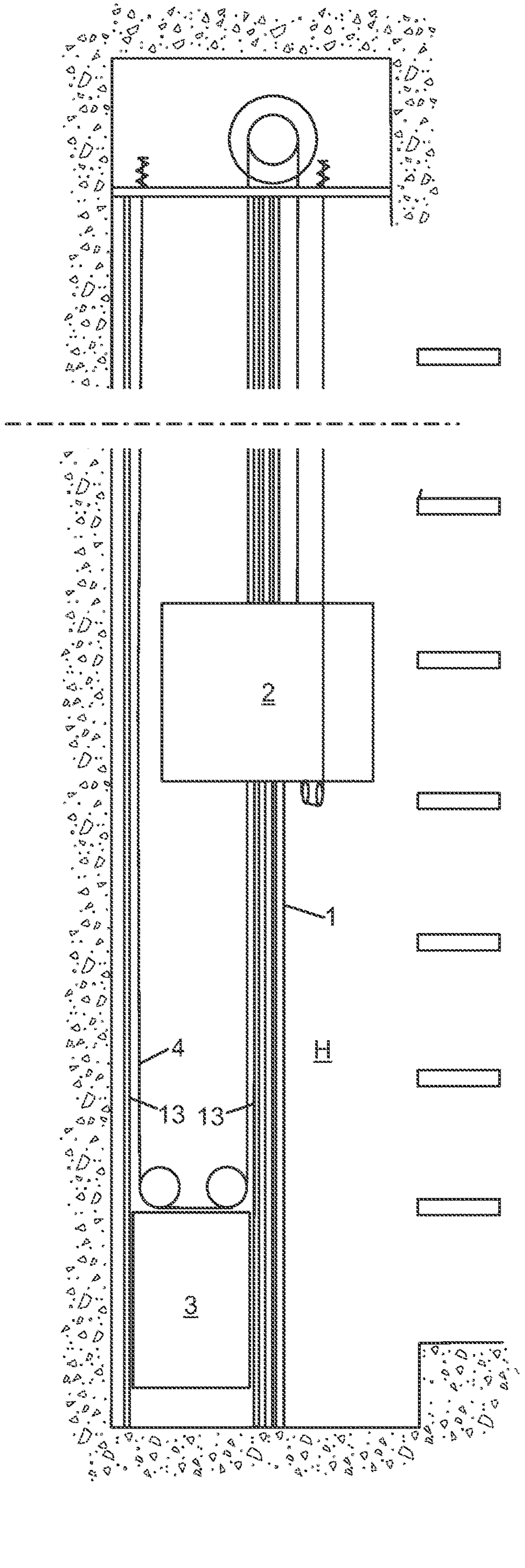
FIG. 7 illustrates a phase of a method for constructing an elevator according to an embodiment where the construction time elevator has been converted into a final elevator.

At a suitable moment after said second using, the method comprises converting the construction time elevator into a final elevator illustrated in FIG. 7. Between said second using and said converting, it is possible although not necessary, to perform additional jumps where the hoisting machine unit 5 is removed and mounted to a higher position, if needed.

For facilitating later removing of the hoisting machine unit 5 from said first position I, the method preferably comprises before said removing, providing a hoisting arrangement 7 actuatable to hoist and/or to lower the guide rail section 1*c* immediately above the guide rail section 1*b* of the hoisting machine unit 5.

The removing of the hoisting machine unit 5 from said first position I is preferably performed as illustrated in FIGS. 1-2. Accordingly, preferably the method comprises assembling a hoisting arrangement A as described referring to FIG. 1, and thereafter hoisting the guide rail section 1*c* immediately above the guide rail section 1*b* of the hoisting machine unit 5 by actuating a hoisting arrangement 7, and thereafter removing the hoisting machine unit 5 from said first position I.

In said hoisting the guide rail section 1*c*, the guide rail section 1*c* immediately above the guide rail section 1*b* of the hoisting machine unit 5 is hoisted such that the guide rail section 1*c* immediately above the guide rail section 1*b* of the hoisting machine unit 5 is raised from being vertically supported by the guide rail section 1*b* of the hoisting machine unit 5 and/or such that a gap is formed or enlarged between the guide rail section 1*b* of the hoisting machine unit 5 and the guide rail section 1*c* immediately above the guide rail section 1*b* of the hoisting machine unit 5. Mere hoisting for relieving the vertical support forces may be sufficient for facilitating the removing, but it may be advantageous to perform said hoisting such that a gap is formed or enlarged as defined.

In an embodiment, the hoisting and/or lowering is performed in response receiving a signal from an operating interface 500, which has been illustrated and described referring to FIG. 8.

Figure 3:
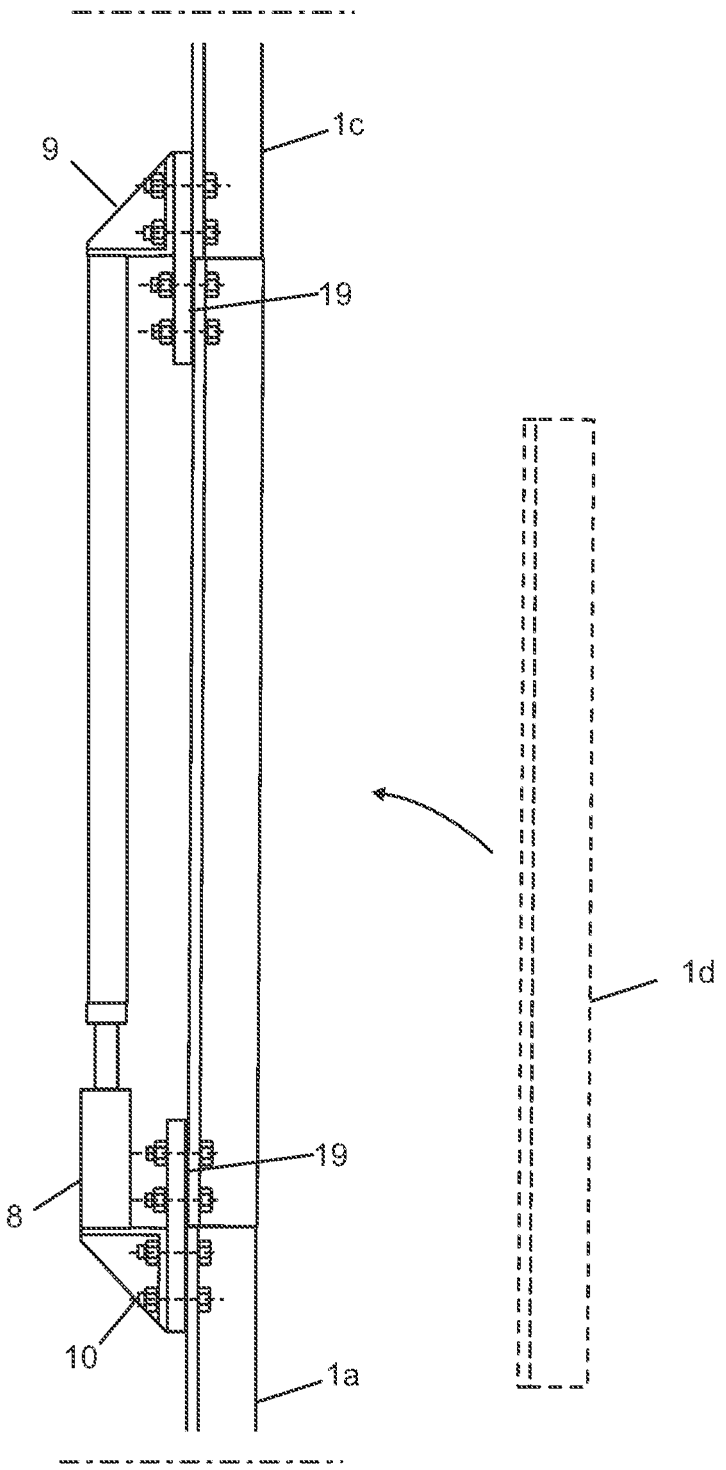
FIG. 3 illustrates installing a guide rail section into the guide rail line in place from where the guide rail section of the hoisting machine unit was removed as illustrated in FIG. 2.

In the embodiment illustrated in FIGS. 1-3, the method comprises after said installing a guide rail section 1*d* into the guide rail line 1 in place from where the guide rail section 1*b* of the hoisting machine unit 5 was removed in said removing, lowering the guide rail section 1*c* which was previously immediately above the guide rail section 1*b* of the hoisting machine unit 5 towards the guide rail section 1*d* installed.

In the embodiment illustrated in FIGS. 1-3, the hoisting and/or lowering is preferably performed with one or more hoisting devices 8 supported by the guide rail section 1*a* immediately below the guide rail section 1*b* of the hoisting machine unit 5 via a bracket 10 fixed on the guide rail section 1*a*. The one or more hoisting devices 8 are preferably actuatable to hoist or lower the guide rail section 1*c* immediately above the guide rail section 1*b* of the hoisting machine unit 5 via a bracket 9 fixed on the guide rail section 1*c*, as illustrated in FIGS. 1-3.

In the embodiment illustrated in FIGS. 1-3, the method comprises between said removing and installing, supporting the weight of the guide rail section 1*c* which was previously immediately above the guide rail section 1*b* of the hoisting machine unit 5 with a hoisting arrangement 7, in particular for preventing it from falling to the place from where the guide rail section 1*b* of the hoisting machine unit 5 was removed.

The removing preferably comprises suspending the hoisting machine unit 5 with a suspender 11 connected to the hoisting machine unit 5 and supported by a structure 12 other than the guide rail line 1. Said structure 12 other than the guide rail line 1 is preferably a working platform 12 vertically movable in the hoistway H. In the preferred embodiment, this is implemented in particular such that the elevator arrangement A comprises a second hoisting arrangement comprising the aforementioned suspender 11 and a second hoisting device 14, e.g. mounted on a working platform 12, and said suspender 11 is movable by the hoisting device 14. Thus, the hoisting machine unit 5 can be for example simply suspended and moved from the first position I, e.g. to be mounted on the working platform 12.

The installing a guide rail section 1*d* into the guide rail line 1 in place from where the guide rail section 1*b* of the hoisting machine unit 5 was removed in said removing is preferably performed as illustrated in FIG. 3. This installing comprises connecting the lower end of the guide rail section 1*d* to the upper end of the guide rail section 1*a* with a fixing element (fish plate) fixed directly to the upper end of the guide rail section 1*a* and connecting the upper end of the guide rail section 1*d* to the lower end of the guide rail section 1*c* with a fixing element (e.g. a fish plate) fixed directly to the lower end of the guide rail section 1*c*. Said guide rail 1*d* here is the guide rail section being installed, and said guide rail 1*a* here is the guide rail section 1*a* that previously was immediately below the guide rail section 1*b* of the hoisting machine unit 5, and said guide rail section 1*c* is the guide rail section 1*c* that previously was immediately above the guide rail section 1*b* of the hoisting machine unit 5.

Preferably, the method comprises after said installing a guide rail section 1*d* into the guide rail line 1 removing the hoisting arrangement 7. The method can comprise mounting it into a higher position in the hoistway H if further jumps are to be made.

For facilitating repositioning of the rope fixings, the method preferably comprises mounting one or more rope fixings 17 and or one or more rope clamps 16 on the working platform 12 to be hoisted to a higher position with the working platform 12, as illustrated in FIG. 5. This can be implemented by mounting the support beam(s) or equivalent (only partially illustrated in FIG. 4) on which the one or more rope fixings 17 and or rope clamps 16 are attached on the working platform 12 to be moved upwards with the working platform 12. After the hoisting, the one or more rope fixings 17 and or rope clamps 16 can be remounted in a higher position in the hoistway H by remounting the support beam(s) or equivalent on which the one or more rope fixings 17 and or rope clamps 16 are attached. Said the support beam(s) or equivalent can be mountable on the guide rail line 1 and/or on the guide rail line 13 or their brackets or on separate brackets mounted in the hoistway, for example.

For facilitating easy adaptation of rope length, in the method, the hoisting roping 4 passes preferably around by the drive wheel 6*a* of the hoisting unit 5 during the hoisting of the hoisting unit 5. The one or more rope clamps 16 are preferably open during the hoisting of the hoisting unit 5 so that additional rope can be pulled via said one or more rope clamps 16 from the rope supply storage 15 as illustrated in FIG. 5. Movement of the drive wheel 6*a* upwards during hoisting of the hoisting unit 5 can produce said pulling of additional rope.

The method preferably comprises hanging the car 2 on the working platform 12 to be hoisted to a higher position with the working platform 12, as illustrated in FIG. 5.

Generally preferably, the guide rail line 1 comprises plurality of guide rail sections 1*a*,1*b*,1*c* piled on top of each other, preferably such that each said guide rail section 1*a*,1*b*,1*c*, or at least some of the guide rail sections 1*a*,1*b*,1*c*, support vertically the guide rail section 1*a*,1*b*,1*c* immediately above it.

Generally preferably, the guide rail line 1 comprises guide rail sections 1*a*,1*c* supported laterally immovably in the hoistway 2 with one or more brackets 20. Each said bracket 20 preferably frictionally engages a guide rail section 1*a*,1*c* with a guide rail clip 21 allowing vertical movement of the guide rail section 1*a*,1*c*. Implementation with guide rail clips provides good adaptability of the guide rail line to dimension changes of the building as well as easy fixing thereof. Implementation with guide rail clips also provides easy hoisting and/or lowering of the guide rail section 1*c* immediately above of the guide rail section 1*b* of the hoisting machine unit 5. It is not necessary that every one of the guide rail sections of the guide rail line is supported laterally immovably by brackets, since they may be connected to each other e.g. with a fixing members 19.

It is possible that the weight of the guide rail section supported laterally immovably in the hoistway with one or more brackets is fully or at least partially carried by said brackets. Thereby, the bottommost guide rail section of the guide rail line does not need to carry the total weight of all the guide rail sections above it. When using guide rail clips there may however be variations in gripping forces and thereby also variation in how large part of the weight of each individual guide rail section is carried by clips.

Generally, by said term immediately above a guide rail section 1*b*, it is meant a guide rail section 1*c*, which is the next guide rail section above the guide rail section 1*b* in question and by said term immediately below a guide rail section 1*b*, it is meant a guide rail section 1*a*, which is the next guide rail section below the guide rail section 1*b* in question.

Generally preferably, the hoisting roping 4 is arranged to suspend both said car 2 and counterweight 3 with suspension ratio 2:1. However, this is not necessary since the ratio could alternatively be 1:1, or possibly any other ratio.

Figure 10:
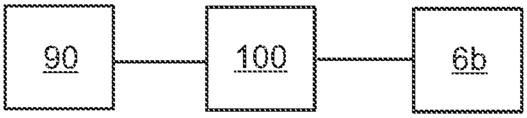
FIG. 10 illustrates a user interface, a control system and a motor of the a hoisting machine of the hoisting machine unit and their preferred connections.

Generally preferably, said first and/or second using comprises receiving by an elevator control system 100 call signals from one or more user interfaces 90, such as one or more user interfaces located at floors and/or in the elevator car and/or mobile user interfaces, which control system 100 is connected with the motor 6*b* of the hoisting machine unit 5, and automatically controlling in response to said call signals by the elevator control system 100 rotation of the motor 6*b*, and thereby movement of the elevator car 2. FIG. 10 illustrates a user interface 90, an elevator control system 100 and a motor 6*b* of the a hoisting machine 6 of the hoisting machine unit 5 and their preferred connections.

Generally, in the illustrated preferred embodiments of the method and arrangement A, the hoisting machine 6 is, when in said first position I and/or second position II, between the guide rail section 1*b* of the hoisting machine unit 5 and a wall of the hoistway H. The hoisting machine 6 is then particularly on the opposite side of said guide rail section 1*b* than the elevator car 2 when viewed from above. In this kind of case, the space for removing and hoisting of the hoisting machine 6 to a higher position, is typically insufficient and thereby when the hoisting machine 6 is thus located, the method and arrangement according to the invention are particularly advantageous. However, one or more of the advantages are achievable even though the context would be different.

Generally, in the illustrated preferred embodiments of the method and arrangement A, one or more guide rail sections 1*c* of the guide rail line 1 are (or are installed to be in the installing step of the method) above the guide rail section 1*b* of the hoisting machine unit 5 supported laterally immovably in the hoistway H with one or more brackets 20, such that when the hoisting machine 6 is in said first position I and/or second position II, the vertical projection of said one or more brackets 20 and the vertical projection of the hoisting machine 6 overlap. In this kind of case, hoisting of the hoisting machine 6 to a higher position is typically blocked by the brackets 20 and thereby, the method and arrangement A according to the invention are particularly advantageous in this context. However, one or more of the advantages are achievable even though the context would be different.

It is to be understood that the above description and the accompanying Figures are only intended to teach the best way known to the inventors to make and use the invention.

It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method for constructing an elevator comprising the steps of:

- providing a hoisting machine unit, the hoisting machine unit comprising a hoisting machine, and a guide rail section, on which the hoisting machine is fixed;
- providing one or more guide rail lines in a hoistway for guiding an elevator car and/or a counterweight, said one or more guide rail lines comprising a guide rail line comprising a plurality of guide rail sections, said providing comprising positioning the hoisting machine unit in a first position such that the guide rail section of the hoisting machine unit is one of said plurality of guide sections, and the guide rail line comprises one or more guide rail sections below the guide rail section of the hoisting machine unit;
- providing the elevator car and the counterweight in the hoistway;
- providing a hoisting roping interconnecting the elevator car and the counterweight;
- using the elevator car a first time for transporting passengers and/or goods while the hoisting machine unit is in said first position;
- installing one or more guide rail sections into the guide rail line above the guide rail section of the hoisting machine unit;
- removing the hoisting machine unit from said first position after a period of said using;
- installing a guide rail section into the guide rail line in place from where the guide rail section of the hoisting machine unit was removed in said removing;
- hoisting the hoisting machine unit;
- mounting the hoisting machine unit to a second position higher than the first position, wherein said mounting comprises placing the guide rail section of the hoisting machine unit on top of the guide rail line; and
- using the elevator car a second time for transporting passengers and/or goods while the hoisting machine unit is in said second position.

2. The method according to claim 1, further comprising providing a hoisting arrangement actuatable to hoist and/or to lower the guide rail section immediately above the guide rail section of the hoisting machine unit.

3. The method according to claim 2, wherein the hoisting and/or lowering of the guide rail section is performed with one or more actuatable hoisting devices of the hoisting arrangement.

4. The method according to claim 3, wherein the one or more actuatable hoisting devices are supported by the guide rail section immediately below the guide rail section of the hoisting machine unit.

5. The method according to claim 3, wherein the one or more actuatable hoisting devices are actuatable to hoist and/or lower the guide rail section immediately above the guide rail section of the hoisting machine unit via a bracket fixed on the guide rail section immediately above the guide rail section of the hoisting machine unit.

6. The method according to claim 2, further comprising hoisting the guide rail section immediately above the guide rail section of the hoisting machine unit before removing the hoisting machine unit from said first position.

7. The method according to claim 1, further comprising hoisting the guide rail section immediately above the guide rail section of the hoisting machine unit before removing the hoisting machine unit from said first position.

8. The method according to claim 7, wherein in said hoisting the guide rail section, the guide rail section immediately above the guide rail section of the hoisting machine unit is hoisted such that the guide rail section immediately above the guide rail section is raised from being vertically supported by the guide rail section of the hoisting machine unit and/or such that a gap is formed or enlarged between the guide rail section of the hoisting machine unit and the guide rail section immediately above the guide rail section of the hoisting machine unit.

9. The method according to claim 1, further comprising between said removing the hoisting machine unit from said first position and installing a guide rail section, supporting vertically the guide rail section which was previously immediately above the guide rail section of the hoisting machine unit with a hoisting arrangement.

10. The method according to claim 1, wherein after installing a guide rail section into the guide rail line in place from where the guide rail section of the hoisting machine unit was removed in said removing, the method further comprises lowering the guide rail section which was previously immediately above the guide rail section of the hoisting machine unit towards the guide rail section installed.

11. The method according to claim 1, wherein hoisting the hoisting machine unit is performed with a working platform vertically movable in the hoistway above the car.

12. The method according to claim 1, wherein one or more guide rail sections of the guide rail line are supported laterally immovably in the hoistway with one or more brackets.

* * * * *